2,748,009
CASEIN COMPOUNDS

Harold K. Salzberg, Bainbridge, N. Y., assignor to The Borden Company, New York, N. Y., a corporation of New Jersey No Drawing. Application January 28, 1952,
Serial No. 268,679

4 Claims. (Cl. 106—146)

The invention here presented is a method for processing casein which is particularly suitable for the preparation of casein complexes which are neither water soluble nor spirit soluble but which are soluble in appropriate mixtures of water and spirit, thereby yielding a casein material which is particularly suitable for use in waterproof adhesives, waterproof coatings, and the like, utilizing as the complexing material an imidazole or an imidazoline.

Casein has long been utilized as a component for coating materials, adhesives, and the like, but it has not been wholly satisfactory for all of these uses because of the fact that it is difficult to make it fully water insoluble and to prevent softening or dissolving in the presence of water, particularly under slightly alkaline conditions.

According to the present invention, it is now found that casein will combine with imidazole or imidazoline compounds to produce very desirable changes in the characteristics of the compounded casein. Preferably the substituted imidazoles or imidazolines are used in which the substituent may contain from about 8 to at least 45 carbon atoms, or on occasion may contain many more, the preferred number of carbon atoms in the substituent being approximately 14.

The treatment with the imidazole or imidazoline compounds may be applied to previously precipitated casein whether precipitated by acid or by rennet of any type. The imidazole or imidazoline compounds are preferably dissolved in mixtures of water and spirit in which they are quite readily soluble, and they may be applied in such solution to dry, precipitated casein. In either event a solid material is readily obtainable which is found to be insoluble in water, insoluble in alcohol, acetone, ether, and the like. It may be noted that the resulting casein compound is soluble only in mixtures of such solvents with water, for which reason the casein compounds are insoluble in naphtha and the hydrocarbon solvents generally which are immiscible with water.

The resulting material is particularly suitable for adhesives since it shows a very high solubility in mixed water-spirit solvents, and a reasonable viscosity, at high solids content, a very rapid evaporation of the mixed solvents and precipitation of the casein compound onto adherable surfaces, and after drying a very high resistance to water or to water solutions of acid, alkali, or salts, and a very high resistance to pure or water-free organic solvents generally.

Thus there is obtained a new compound of casein or other protein materials with imidazole and imidazoline compounds generally, which compositions show new, unusual, and very valuable physical and chemical properties in the way of flexibility of the solid compounds, adhesiveness, and resistance to solvents. Other objects and details of the invention will be apparent from the following description.

In practicing the invention, the casein, which is the preferred raw material for the invention, may be obtained in any desired form. Preferably it is obtained in precipitated form as produced by acid precipitation or by rennet precipitation. It does not affirmatively appear that the various kinds of casein show significant differences in this procedure; all are usable substantially without regard to source or character, provided only that they are reasonably pure and clean.

Alternatively, other proteins may be used, especially the soy protein, which likewise makes an excellent complex which also is soluble in water and spirit mixtures as above outlined. It is believed that the reaction is a general one with any protein from any source including not only casein and soy protein but also gelatin in its various forms, blood albumin, and the like. Also, the reaction is applicable to the fatty amines which show a similar behaviour.

The resulting casein is then combined with an imidazole or imidazoline compound. The basic imidazole compound has the structural formula:

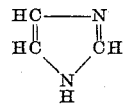

thus being a five-member ring containing three carbon atoms and two nitrogen atoms, all of the carbons being doubly linked, whereas the imidazoline compound, having the formula:

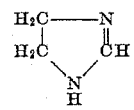

differs by the saturation of the double linkage between two of the three carbons. The most easily substituted hydrogen is the one upon the carbon atom interposed, in the ring, between the two nitrogens, but any of the other hydrogens may also be substituted. The hydrogen upon the second nitrogen atom may also be replaced by a substituent which may be hydroxyl or hydroxyalkyl or aminoalkyl groups. The preferred imidazole and imidazoline compounds are:

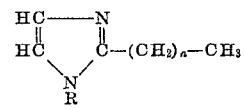

and

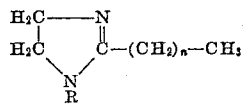

in which R is hydrogen or an alkyl, aryl, aralkyl, hydroxyalkyl, or aminoalkyl group and $n$ is preferably an integer of 7 or more.

It is found that the reaction occurs with any of the imidazole or imidazoline compounds without regard to the size, character, or presence of substituents, but the solubility relationships are not so desirable when the substituent contains less than 8 or 10 carbon atoms since the solubility in any solvent combination decreases as the number of carbon atoms in the substituents is reduced.

These nitrogen compounds may be combined with the casein or other protein in any of several different ways. Thus, the precipitated casein may be mixed in the dry with the imidazole or imidazoline and "worked" until the reaction is complete. The "working," that is, the preparation of the complex, may be conducted on a pair of double rolls, that is, the standard rubber compounding rolls, or the compound may be prepared in a muller or by repeated extrusion by means of an extruder screw and orifice plate, or the well-known Werner & Pfleiderer kneader-mixer may be used, or in fact any type of mixer or kneader which has sufficient power to bring the two compounds into intimate contact. The reaction occurs readily and satisfactorily in the dry, especialy at moderately elevated temperatures. Alternatively, however, the reaction may also be conducted in the presence of small amounts of mixtures of water and spirit although no apparent advantage occurs from this procedure except perhaps a reduction in power requirements in the kneader.

The reaction occurs promptly and the fact of reaction is evidenced by a rather pronounced change in character of the solid casein from a dry, brittle, granular material into a rather tougher but still friable mass which shows a substantially complete insolubility in water, a substantially complete insolubility in organic solvents generally, and a very ready solubility in appropriate mixtures of water and spirit.

Thus, the existence of these imidazole and imidazoline reagents as free though substituted bases makes possible the combination of them with the acidic groups in the casein, and it has been observed that the seat of reaction lies primarily with the organic acidic groups which are known to be present in the casein structure. At the same time, the base carries with it into the structure of the complex all that is bound to it, including the high molecular weight substituent group. It is the incorporation of these groups in close combination with the casein that gives this protein enhanced properties in several respects.

The preferred methods of practicing the invention are shown in the following examples, but these are representative only and are not intended to limit the scope of the invention.

Example 1

5 lbs. of casein, which had been prepared by the treatment of skimmed milk with sulfuric acid, was wetted with 1 lb. of water and 1.25 lbs. of 1-hydroxyethyl-2-heptadecenyl imidazole (known commercially also as amine 220). The casein became rubbery and slightly sticky. The mixture was extruded through a hot die to yield a ribbon of waxy feel which was dried and ground to a powder. As a test for solubility, 20 g. of this product was added to a mixture of 30 g. of water and 30 g. of 91% isopropyl alcohol, and the whole agitated at room temperature. A solution of homogeneous appearance and of pH 6.8 resulted in 3 hours.

Example 2

5 lbs. of casein was treated with a premixed solution of 0.5 lb. of water, 0.5 lb. of 91% isopropyl alcohol, and 2 lbs. of 1-aminoethyl-2-heptadecenyl imidazole (known commercially also as amine 230) to yield a clear brown rubbery mass which was immediately broken up and dried. A solution of 20 g. of this dried product in a blend of 30 g. of water and 30 g. of 91% isopropyl alcohol was prepared. It was a complete solution of the casein complex, having pH 7.8. The solution was cast at 0.02" liquid film thickness and dried to films at 140° F. These films were conditioned at 54% relative humidity and 76° F. and rated in tests as follows:

| | |
|---|---|
| Flexibility | less brittle than ordinary casein films |
| Curl | slight |
| Color | light yellow tinge |
| Clarity | slightly cloudy |
| Feel | waxy |
| Separation | none |
| Water solubility | insoluble |

The solution stored for a period of one month at prevailing room temperatures did not change with respect to homogeneity, viscosity, or color or show any evidence of mold growth or bacterial decomposition.

Example 3

5 lbs. of casein was treated with a chilled mixture of 0.5 lb. of water, 0.5 lb. of 91% isopropyl alcohol, and 1.75 lbs. of 1-alkyl-2-undecyl imidazoline (known commercially as amine C). The friable mass was immediately broken up, dried at 150° F. for 8 hours, and ground to a 50-mesh fineness. The product was dissolved at room temperature in a blend of acetone and water to yield a homogeneous solution of syrupy consistency, of color: Tan No. 123 of the Webster Dictionary Color Chart, and and having viscosity 283 cp. at room temperature.

This preparation was divided and the several portions used successfully as follows: (1) in adhering paper labels to new tin cans, (2) in coating paper with pigments of the type used in printing inks, including carbon black, red toner, and Victoria Blue, and (3) in coating paper to provide greaseproofness.

Example 4

A solution of casein complex prepared as in the preceding example was divided into portions, to each of which was added one of the following materials, known as plasticizers for casein: Santicizer 9 (mixed ortho- and para-toluene sulfonamides), glycerol, ethanol formamide, and N-acetyl ethanolamine. In all cases the dry films obtained from these mixtures were rated high in flexibility after conditioning at 54% relative humidity and 73° F., showing that the casein, though modified by the reaction of this invention, still responds to film-softening agents customarily employed.

Thus, the present invention provides a new composition of matter consisting of a protein such as casein or the like in combination with an imidazole compound or an imidazoline compound, either of these compounds preferably having a substituent containing a substantial number of carbon atoms of which the most efficient appear to contain from 10 to 12 carbon atoms in the substituent.

A representative list of imidazole and imidazoline compounds consists of the following:

1-hydroxyethyl-2-heptadecenyl imidazole hydrochloride
1-aminoethyl-2-heptadecenyl imidazole hydrochloride
2-heptadecyl imidazole hydrochloride
2-heptadecyl imidazoline hydrochloride
2-undecyl imidazoline hydrochloride The compounds above listed are, of course, representative only, and the invention includes substantially any imidazole and imidazoline compound in combination with substantially any protein.

Thus, the present invention produces a modified casein or protein having superior properties for many industrial uses, including better plasticity, higher adhesive power, better resistance to bacterial attack, and better resistance to solvents and other substances which tend to attack the ordinary proteins.

While there are above disclosed but a limited number of embodiments of the material and process of the present invention it is possible to provide still other embodiments without departing from the inventive concept herein disclosed, and it is therefore desired that only such limitations be imposed on the appended claims as are stated therein or required by the prior art.

The invention claimed is:

1. The combination of casein with a compound selected from the group consisting of alkyl substitution products of imidazole and imidazoline nuclei, the alkyl groups consisting entirely of carbon and hydrogen, containing at least 8 carbon atoms, and being attached at the 2 position in the said nuclei and the said compound being in the proportion to cause the combination of casein therewith to be insoluble in water and alcohol and soluble in mixed alcohol and water.

2. A casein derivative characterized by insolubility in water and alcohol and solubility in mixed water and alcohol and being a combination of casein with 1-aminoethyl-2-heptadecenyl imidazole in the proportion of at least about 1.25 parts by weight for 5 of the casein.

3. A casein derivative characterized by insolubility in water and alcohol and solubility in mixed water and alcohol and being a combination of casein with 1-hydroxyethyl-2-heptadecenyl imidazole in the proportion of at least about 1.25 parts by weight for 5 of the casein.

4. The composition of claim 1 in which an additional hydrogen of the said nuclei is substituted by a substituent selected from the group consisting of alkyl, aryl, aralkyl, hydroxyalkyl, and aminoalkyl groups.

References Cited in the file of this patent

UNITED STATES PATENTS

| | | |
|---|---|---|
| 1,772,131 | Davidson | Aug. 5, 1930 |
| 1,981,588 | Dunham | Nov. 20, 1934 |
| 2,262,770 | La Piana | Nov. 18, 1941 |
| 2,300,907 | Bronson | Nov. 3, 1942 |
| 2,374,667 | Dangelmajer | May 1, 1945 |
| 2,561,814 | Novotny et al. | July 24, 1951 |
| 2,581,111 | Lander et al. | Jan. 1, 1952 |
| 2,656,271 | Reichel et al. | Oct. 20, 1953 |